(12) United States Patent
Ortner (10) Patent No.: US 10,048,091 B1
(45) Date of Patent: Aug. 14, 2018

(54) MAGNETIC MULTIMEDIA CONTROL ELEMENT

(71) Applicant: Infineon Technologies AG, Neubiberg (DE)

(72) Inventor: Michael Ortner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/608,518

(22) Filed: May 30, 2017

(51) Int. Cl.
| | |
|---|---|
| G01D 5/14 | (2006.01) |
| G06F 3/0346 | (2013.01) |
| G06F 3/046 | (2006.01) |
| G06F 3/0338 | (2013.01) |
| G05G 9/047 | (2006.01) |

(52) U.S. Cl.
CPC .......... G01D 5/145 (2013.01); G06F 3/0338 (2013.01); G06F 3/0346 (2013.01); G06F 3/046 (2013.01); G05G 2009/04755 (2013.01)

(58) Field of Classification Search
CPC ...... G06F 3/033; G06F 3/0338; G06F 3/0346; G06F 3/046; G01D 5/145; G05G 2009/04714; G05G 2009/04737; G05G 2009/0474; G05G 2009/04748; G05G 2009/04751; G05G 2009/04755; G05G 9/00; G05G 9/02; G05G 9/047
See application file for complete search history.

(56) References Cited

U.S. PATENT DOCUMENTS

| | | | |
|---|---|---|---|
| 8,186,240 B2* | 5/2012 | Sakai | A43B 21/42 200/6 A |
| 2010/0265176 A1* | 10/2010 | Olsson | G05G 5/05 345/161 |

* cited by examiner

*Primary Examiner* — Hai Phan
*Assistant Examiner* — Franklin Balseca
(74) *Attorney, Agent, or Firm* — Harrity & Harrity, LLP (57) ABSTRACT

A magnetic sensor may include a set of elements to detect a set of magnetic field strengths of a magnetic field generated by a magnet, and determine, based on the set of magnetic field strengths, a state of an object with respect to multiple degrees of freedom of object movement. The magnet may be connected to the object such that a center of the magnet is offset from an axis of rotation of the object and such that the magnet is angled with respect to a direction that is substantially perpendicular to the axis of rotation when the object is in an un-tilted position. The magnetic sensor may be substantially centered on the axis of rotation of the object when the object is in the un-tilted position.

20 Claims, 10 Drawing Sheets

MAGNETIC MULTIMEDIA CONTROL ELEMENT

BACKGROUND

A magnetic sensor may be capable of sensing multiple (e.g., perpendicular) components of a magnetic field applied to the magnetic sensor, such as an x-component, a y-component, and a z-component. The magnetic sensor may be used to detect, for example, movement, position, an angle of rotation, and/or the like, of a magnet, connected to an object, in a variety of applications, such as an automotive application, an industrial application, or a consumer application.

SUMMARY

According to some possible implementations, a magnetic sensor may include a set of elements to: detect a set of magnetic field strengths of a magnetic field generated by a magnet; and determine, based on the set of magnetic field strengths, a state of an object with respect to multiple degrees of freedom of object movement, where the magnet is connected to the object such that a center of the magnet is offset from an axis of rotation of the object and such that the magnet is angled with respect to a direction that is substantially perpendicular to the axis of rotation when the object is in an un-tilted position, and where the magnetic sensor is substantially centered on the axis of rotation of the object when the object is in the un-tilted position.

According to some possible implementations, an apparatus may include: a magnet connected to an object capable of being positioned with respect to multiple degrees of freedom, where the magnet is connected to the object such that a center of the magnet is offset from an axis of rotation of the object and such that the magnet is angled with respect to a direction that is perpendicular to the axis of rotation; and a magnetic sensor to: determine a state of the object, with respect to the multiple degrees of freedom, based on a set of magnetic field strengths of a magnetic field generated by the magnet, where the magnetic sensor is substantially centered on the axis of rotation when the object is in an un-tilted position.

According to some possible implementations, a system may include: an object capable of being positioned with respect to multiple degrees of freedom; a magnet asymmetrically connected to the object such that a center of the magnet is offset from an axis of rotation of the object and such that the magnet is angled with respect to a direction that is substantially perpendicular to the axis of rotation; and a magnetic sensor to determine a state of the object, with respect to the multiple degrees of freedom, based on a magnetic field applied to the magnetic sensor by the magnet, the magnetic sensor being substantially centered on the axis of rotation when the object is in an un-tilted position.

DETAILED DESCRIPTION

The following detailed description of example implementations refers to the accompanying drawings. The same reference numbers in different drawings may identify the same or similar elements.

A tilt position, a linear position, and a rotational position of an object (herein collectively referred to as a "state" of the object) may be of interest in a given application. For example, a control element, included in a vehicle, may allow a user (e.g., a driver of an automobile) to control one or more systems of the vehicle (e.g., a multimedia system, a navigation system, an audio system, a telephone system, and/or the like) by manipulating the state the control element.

In some cases, the object may be positioned with respect to four degrees of freedom: a tilt position with respect to a first direction (e.g., an x-direction), a tilt position with respect to a second direction (e.g., a y-direction), a linear position along a third direction (e.g., a "push-button" position along a z-direction), and a rotational position (e.g., when not tilted with respect to the first direction or the second direction, when tilted with respect to the first direction and/or the second direction, when in the push-button position along the third direction, when not in the push-button position along the third direction, and/or the like).

In such cases, multiple sensor systems, sometimes using different sensing principles, may be implemented in order to detect the state of the object. For example, optical sensor systems (e.g., a pair of optical sensor systems including photodiodes, light guides, light emitting diodes, and/or the like) may be used to detect the tilt of the object with respect to the first direction and the second direction, a sensor system including a set of tactile switches may be used to detect the position along the third direction (i.e., whether the control element is in the push-button position or is not in the push-button position), and an incremental optical encoder sensor system may be used to detect the rotational position of the object. However, implementing these multiple sensor systems may come with a substantial cost and/or complexity.

Implementations described herein provide a magnetic sensor system, including a single magnetic sensor and a single magnet, that is capable of detecting a state of an object with respect to four degrees of freedom: a tilt with respect to a first direction, a tilt with respect to a second direction, a position along a third direction, and a rotational position (e.g., on a plane associated with the first direction and the second direction).

Here, since a single magnetic sensor and a single magnet are needed, the magnetic sensor system has a reduced complexity and/or a reduced cost (e.g., as compared to an implementation that uses multiple sensor systems to detect the state of the object). Moreover, the magnetic sensor system provides for absolute encoding of the state of the object, thereby reducing complexity and/or increasing reliability of detecting the state of the object. Further, due to the use of magnetic sensing principles, the magnetic sensor system described herein has an increased lifetime (e.g., due to contact-free, and thus wear-free, operation), an increased potential for miniaturization, and an increased robustness against, for example, temperature variation and dirt.

Figure 1:
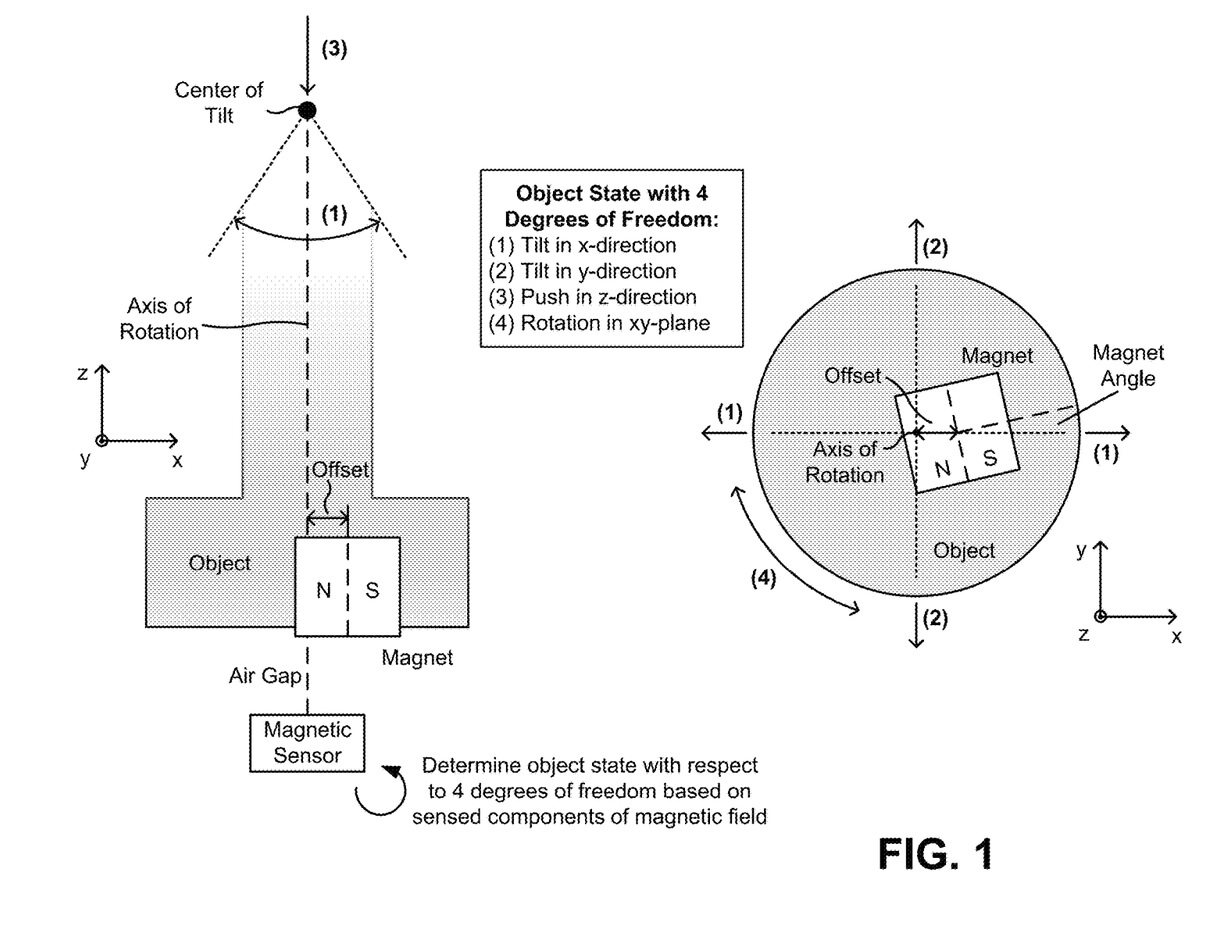
FIG. 1 is a diagram of an overview of an example implementation described herein.

FIG. 1 is a diagram of an overview of an example implementation 100 described herein. As shown in FIG. 1, an object may be positioned in a state described by four degrees of freedom, including (1) a tilt position with respect to an x-direction, (2) a tilt position with respect to a y-direction, (3) a linear (or push) position with respect to a z-direction, and (4) a rotational position with respect to (approximately) an xy-plane. As described above, the state of the object may be of interest in a given application, such as when the object is part of a control element that allows a user to control a system in, for example, an automobile.

As further shown in FIG. 1, a magnet may be asymmetrically connected to the object. For example, as shown in the left portion of FIG. 1, a center of the magnet may be offset from an axis of rotation of the object by a particular distance. Further, as shown in the right portion of FIG. 1, the magnet may be arranged such that the magnet is rotated about the center of the magnet by a particular magnet angle (i.e., such that a plane separating poles of the magnet is not perpendicular to the x-direction or the y-direction).

As further shown, a magnetic sensor may be arranged relative to the object and the magnet. For example, as shown in the left portion of FIG. 1, the magnetic sensor may be arranged such that the magnetic sensor is centered on the axis of rotation (e.g., when the object is not tilted). As further shown, the magnetic sensor may be arranged such that the magnetic sensor is separated from the magnet by an air gap of a particular distance (e.g., when the object is not tilted).

During operation, the magnetic sensor may sense components (e.g., an x-component, a y-component, and a z-component) of the magnetic field generated by the magnet. As noted, in FIG. 1, the magnetic sensor may determine the state of the object, with respect to the four degrees of freedom, based on the sensed components of the magnetic field. For example, the magnetic sensor may determine the state of the object based on mapping information that associates possible states of the object with corresponding sets of magnetic field strengths within a three-dimensional magnetic space. Here, each possible state of the object may be uniquely represented in the three-dimensional magnetic space as a result of the asymmetrical mounting of the magnet with respect to the object and the magnetic sensor. Additional details regarding the arrangement and operation of the magnetic sensor system are described below.

In this way, a magnetic sensor system, including a single magnetic sensor and a single magnet, may determine a state of an object with respect to multiple degrees of freedom. The multiple degrees of freedom may include, for example a tilt with respect to a first direction, a tilt with respect to a second direction, a position along a third direction, and a rotational position (e.g., on a plane associated with the first direction and the second direction).

As indicated above, FIG. 1 is provided merely as an example. Other examples are possible and may differ from what was described with regard to FIG. 1.

Figure 2A:
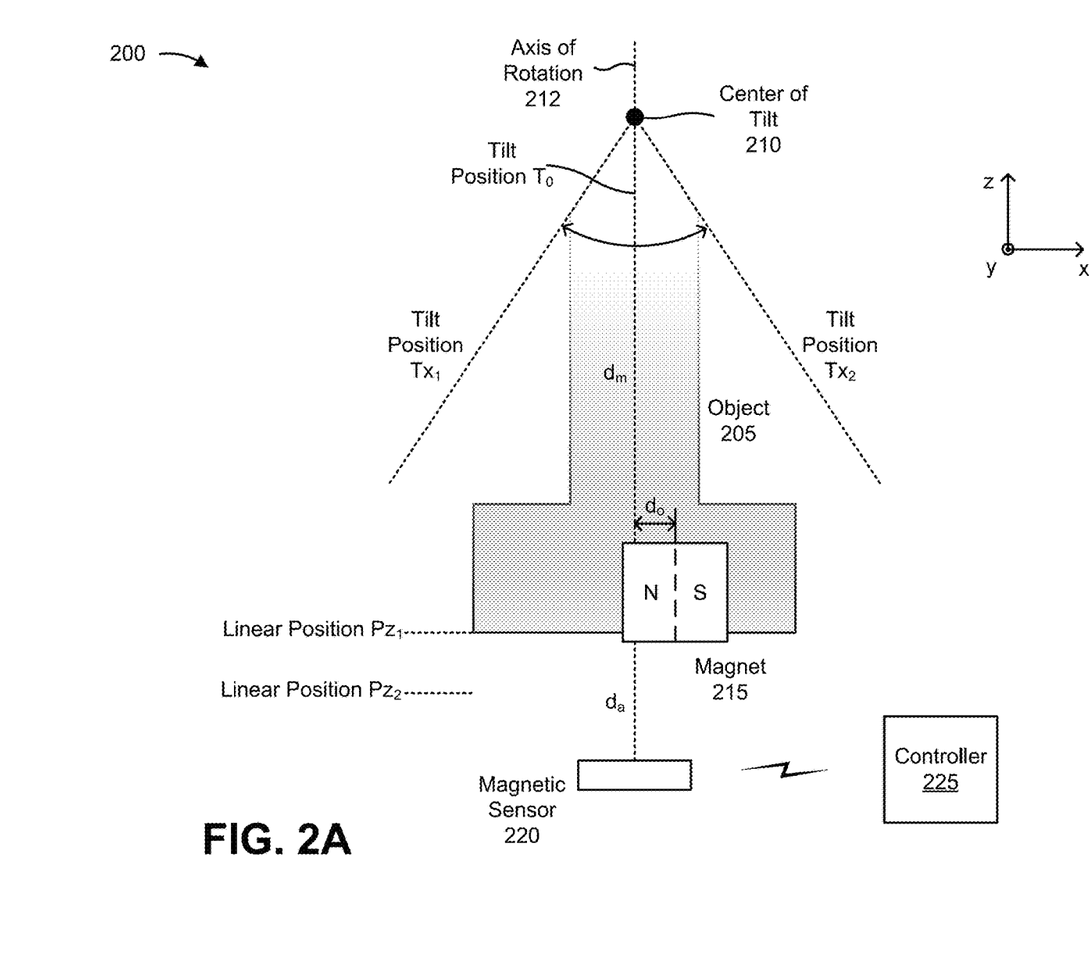
FIGS. 2A and 2B are diagrams of an example environment in which systems and/or methods, described herein, may be implemented.

FIGS. 2A and 2B are diagrams of an example environment 200 in which apparatuses described herein may be implemented. As shown in FIG. 2A, environment 200 may include an object 205 that may be positioned (e.g., via tilting, linear movement, and/or rotation) with respect to a center of tilt 210 and axis of rotation 212 (as described below), a magnet 215 connected (e.g., mechanically connected) to object 205, a magnetic sensor 220, and a controller 225.

Object 205 includes an object for which a state (e.g., a tilt position, a linear position, a rotational position, and/or the like) is of interest for a given application. For example, object 205 may include a control element (e.g., a joystick, a knob, a dial, a wheel, a button, or any combination thereof) included in, for example, a vehicle for use in controlling a system, such as a multimedia system, a navigation system, an audio system, a telephone system, and/or the like. In some implementations, object 205 is connected (e.g., attached to, coupled with, affixed to, embedded in, and/or the like) to magnet 215, as described below.

In some implementations, object 205 is capable of tilting (e.g., about center of tilt 210) with respect to a first direction (e.g., an x-direction) and a second direction (e.g., a direction that is substantially perpendicular to the x-direction, such as a y-direction) such that object 205 may be in multiple tilt positions. For example, as shown in FIG. 2A, if object 205 is not tilted with respect to the x-direction or the y-direction, then object 205 may be in an un-tilted position ($T_0$). As shown, if object 205 is tilted in a first direction with respect to the x-direction (a left direction as shown in FIG. 2A), then object 205 may be in a first x-tilt position ($Tx_1$). As further shown, if object 205 is tilted in a second direction with respect to the x-direction (a right direction as shown in FIG. 2A), then object 205 may be in a second x-tilt position ($Tx_2$). Similarly, while not shown, if object 205 is tilted in a first direction with respect to the y-direction (e.g., into the page of FIG. 2A), then object 205 may be in a first y-tilt position ($Ty_1$), and if object 205 is tilted in a second direction with respect to the y-direction (e.g., out of the page of FIG. 2A), then object 205 may be in a second y-tilt position ($Ty_2$). In other words, in some implementations, object 205 may be capable of being positioned in multiple tilt positions (e.g., three tilt positions, five tilt positions, nine tilt positions, and/or the like). For example, in example environment 200, object 205 is capable of being positioned in five tilt positions (e.g., $T_0$, $Tx_1$, $Tx_2$, $Ty_1$, and $Ty_2$).

In some implementations, object 205 is capable of being positioned in at least two linear positions along a third direction (e.g., a direction that is substantially perpendicular to the x-direction and the y-direction, such as a z-direction). For example, as shown in FIG. 2A, if object 205 is in not in a pushed position (e.g., when the control element is not pressed into a push-button position), then object 205 may be in a first linear position ($Pz_1$) along the z-direction. As further shown, if object 205 is in the pushed position (e.g., when the control element is pressed into the push-button position), then object 205 may be in a second linear position ($Pz_2$) along the z-direction.

In some implementations, object 205 may be in linear position $Pz_2$ only when object 205 is positioned at tilt position $T_0$ (i.e., push-button may be enabled only when object 205 is not tilted). Alternatively, in some implementations, object 205 may be in the pushed position when object 205 is tilted with respect to the x-direction and/or the y-direction. In some implementations, object 205 may be capable of being positioned in multiple linear positions (e.g., two linear positions, three linear positions, five linear positions, and/or the like). For example, in example environment 200, object 205 is capable of being positioned in two linear positions (e.g., $Pz_1$ and $Pz_2$).

Figure 2B:
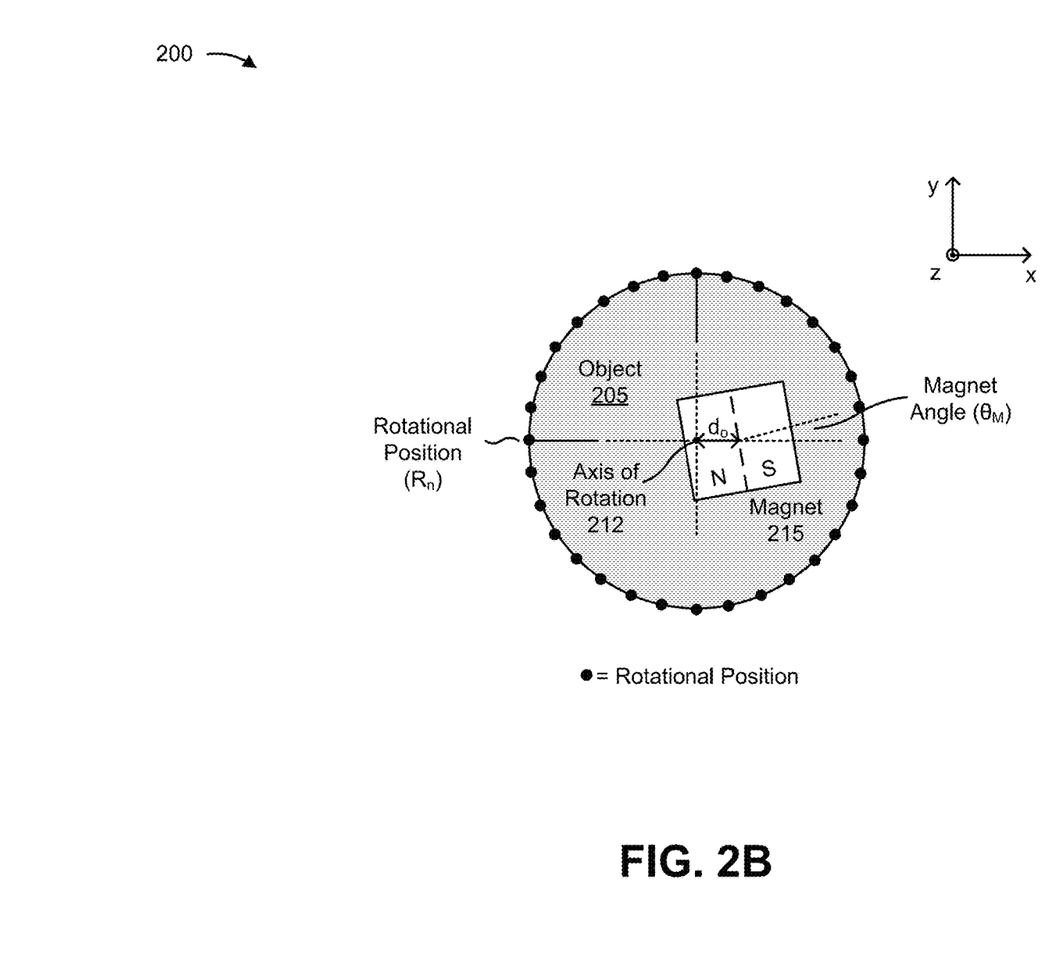

As shown in FIG. 2B, in some implementations, object 205 is capable of rotating about axis of rotation 212 (e.g., an axis that is substantially parallel to (i.e., aligned with) the z-direction and that passes through center of tilt 210) such that object 205 may be positioned in multiple rotational positions. For example, object 205 may be positioned in n (n>1) rotational positions $R_1$ through $R_n$. In some implementations, the number of n rotational positions may be, for example, 8, 16, 32, 44, and/or the like. In FIG. 2B, object 205 is in a particular rotational position $R_n$ of 32 possible rotational positions. As shown in FIG. 2A, in some implementations, each of the n rotational positions may be evenly spaced about axis of rotation 212. Alternatively, two or more of the n rotational positions may be unevenly spaced about axis of rotation 212. In some implementations, object 205 may be in any of the n rotational positions while object 205 is in any tilt position and/or in any linear position.

In some implementations, object 205 may be in one of multiple states, where each state is associated with a tilt position, a linear position, and/or rotational position. For example, using the examples described above, assume that at a given time, object 205 may be in the pushed position or the non-pushed position, and that, while in the non-pushed position, object 205 may also be in one of five tilt positions and one of 32 rotational positions (assume that tilt position and rotational position are not of interest while object 205 is in the pushed position). In this example, object 205 has 161 possible states (e.g., 1+(32×5)=161). In some implementations, each possible state of object 205 may be mapped to a corresponding set of magnetic field strengths in order to allow the state of object 205 to be determined based on sensing components of a magnetic field produced by magnet 215, as described below.

Magnet 215 includes a magnet that is connected (e.g., attached, coupled, affixed, and/or the like) to object 205 such that a state of magnet 215 corresponds to a state of object 205, as described herein. In some implementations, magnet 215 comprises a first half forming a north pole (N) and a second half forming a south pole (S), so that magnet 215 comprises one pole pair. For example, as shown in FIGS. 2A and 2B, magnet 215 may include a diametrally magnetized magnet with a north pole on a first half of magnet 215 and a south pole on a second half of magnet 215. As another example, magnet 215 may include an axially magnetized magnet with a north pole on a first half of magnet 215 that is stacked (e.g., along the z-direction) on a south pole on a second half of magnet 215 (not shown). Additionally, or alternatively, magnet 215 may include a dipole magnet (e.g., a dipole bar magnet, a circular dipole magnet, an elliptical dipole magnet, etc.), a permanent magnet, an electromagnet, a magnetic tape, and/or the like. In some implementations, magnet 215 may, without limitation, comprise more than one pole pair.

In some implementations, magnet 215 may be comprised of a ferromagnetic material (e.g., Hard Ferrite), and may produce a magnetic field. In some implementations, magnet 215 may further comprise a rare earth magnet, which may be of advantage due to an intrinsically high magnetic field strength of rare earth magnets. In some implementations, magnet 215 may be a homogeneously magnetized magnet with a residual induction (Br) in range from 150 millitesla (mT) to approximately 1400 mT, such as 1000 mT.

In some implementations, a dimension of magnet 215 (e.g., a length, a width, a height, a diameter, a radius, and/or the like) may be in a range from approximately 1 millimeter (mm) to approximately 15 mm, such as 3 mm. As a particular example, magnet 215 may have a length, a width, and a height of approximately 3 mm (i.e., magnet 215 may be a 3 mm×3 mm×3 mm cube). Notably, while magnet 215 is shown as having a square shape in FIGS. 2A and 2B, magnet 215 may have another shape, such as a rectangular shape, a circular shape, an elliptical shape, a triangular shape, a ring shape, and/or the like.

In some implementations, magnet 215 may be connected to object 205 in an asymmetric manner. For example, as shown in both FIGS. 2A and 2B, magnet 215 may be connected to object 205 such that a center of magnet 215 is arranged at an offset distance $d_o$ from axis of rotation 212.

In some implementations, distance $d_o$ may be in a range from approximately 0.2 mm to approximately 5.0 mm, such as 0.5 mm.

As further shown in FIG. 2A, magnet 215 may be arranged such that center of tilt 210 is an axial distance $d_m$ from a closest surface of magnet 215 (e.g., a top surface in FIG. 2A). In some implementations, the distance $d_m$ may be in a range from approximately 5 mm to approximately 30 mm. In some implementations, the distance $d_m$ may be selected in order to provide sufficient magnetic state separation between states of object 205 (e.g., magnetic state separation that allows each state of object 205 to be reliably mapped and/or identified), as described herein. For example, assume that each of tilt positions $Tx_1$, $Tx_2$, $Ty_1$, and $Ty_2$ of object 205 has an angle of approximately 5 degrees (in the respective tilt directions) with respect to axis of rotation 212, that magnet 215 is a 3 mm cube, and that sufficient magnetic state separation is achieved when magnet 215 shifts by at least 1 mm between tilt position $T_0$ and any of $Tx_1$, $Tx_2$, $Ty_1$, and $Ty_2$. In this example, distance $d_m$ may be selected to be approximately 12.6 mm, which results in magnet 215 shifting by at least 1 mm between tilt position $T_0$ and any other tilt position (e.g., since 12.6 mm×tan(5°)=1.0 mm). In some implementations, the distance $d_m$ may be selected such that a surface of magnet 215 extends (e.g., in the z-direction) beyond a surface of object 205, as shown in FIG. 2A. Alternatively, the distance $d_m$ may be selected such that the surface of magnet 215 is flush with the surface of object 205 or such that the surface of object 205 extends beyond the surface of magnet 215 (not shown).

As shown in FIG. 2B, magnet 215 may be arranged such that magnet 215 is angled with respect to the x-direction and the y-direction (e.g., at magnet angle $\theta_M$ with respect to the x-direction and the y-direction). In some implementations, magnet angle $\theta_M$ may be in a range from approximately 10° to approximately 80°, such as approximately 57°.

In some implementations, the asymmetric mounting of magnet 215 (e.g., arranging at distance $d_o$ and at magnet angle $\theta_M$) provides for magnetic state separation among states of object 205 such that the state of object 205 may be reliably identified by magnetic sensor 220, as described below.

Magnetic sensor 220 includes one or more apparatuses for sensing components of a magnetic field for use in determining a state of object 205 (e.g., based on a state of magnet 215 relative to magnetic sensor 220). For example, magnetic sensor 220 may include one or more circuits (e.g., one or more integrated circuits) that operate to sense an x-component of a magnetic field produced by magnet 215, a y-component of the magnetic field produced by magnet 215, and a z-component of the magnetic field produced by magnet 215 (i.e., magnetic sensor 220 may be a 3D magnetic sensor). In some implementations, magnetic sensor 220 may include an integrated circuit that includes an integrated controller 225 (e.g., such that an output of magnetic sensor 220 may include information that describes a state of magnet 215 and/or a state of object 205). In some implementations, magnetic sensor 220 may include sensing elements configured to sense the components of the magnetic field produced by magnet 215. In some implementations, magnetic sensor 220 may be capable of sensing magnetic field strengths of approximately 150 mT in order to increase stray field robustness (e.g., as compared to a magnetic sensor capable of sensing magnetic fields less than 150 mT). Additional details regarding magnetic sensor 220 are described below with regard to FIG. 3.

In some implementations, magnetic sensor 220 may be arranged at a position relative to magnet 215 such that magnetic sensor 220 may detect components of a magnetic field produced by magnet 215. For example, as shown in FIG. 2A, magnetic sensor 220 may be arranged such that magnetic sensor 220 is centered on axis of rotation 212 with an air gap distance ($d_a$) between magnetic sensor 220 and magnet 215 (e.g., when object is in tilt position $T_0$). Here, magnetic sensor 220 may be capable of sensing an x-component, a y-component, and a z-component of the magnetic field produced by magnet 215.

In some implementations, magnetic sensor 220 may be configured with mapping information associated with determining the state of object 205 based on the sensed components of the magnetic field. The mapping information may include information associated with a state (e.g., information that identifies a tilt position, a linear position, and/or a rotational position corresponding to the state) and a set of magnetic field strengths, corresponding to the state, including a magnetic field strength in the x-direction, a magnetic field strength in the y-direction, and a magnetic field strength in the z-direction. The mapping information may include such information for multiple states. For example, using the example described above, the mapping information may include information associated with 161 possible states of object 205 and 161 sets of magnetic field strengths, each corresponding to a different one of the 161 possible states. In some implementations, magnetic sensor 220 may be configured with the mapping information during a manufacturing process associated with the magnetic sensor system, a calibration process associated with the magnetic sensor system, a setup process associated with the magnetic sensor system, and/or the like.

During operation, magnetic sensor 220 may sense the x-component of the magnetic field produced by magnet 215, the y-component of the magnetic field produced by magnet 215, and the z-component of the magnetic field produced by magnet 215. Magnetic sensor 220 may then compare the sensed magnetic field strengths to the mapping information, and determine the state of object based on the comparison. For example, magnetic sensor 220 may identify a set of magnetic field strengths, included in the mapping information, that match (e.g., within a threshold) the sensed components of the magnetic field (e.g., a set of magnetic field strengths including a magnetic field strength in the x-direction that matches the sensed x-component of the magnetic field, a magnetic field strength in the y-direction that matches the sensed y-component of the magnetic field, and a magnetic field strength in the z-direction that matches the sensed z-component of the magnetic field). In this example, magnetic sensor 220 may determine the state of object 205 as the state corresponding to the matched mapping information.

Controller 225 may include one or more circuits associated with determining a state of object 205, and providing information associated with the state of object 205. For example, controller 225 may include one or more circuits (e.g., an integrated circuit, a control circuit, a feedback circuit, etc.). Controller 225 may receive input signals from one or more sensors, such as one or more magnetic sensors 220, may process the input signals (e.g., using an analog signal processor, a digital signal processor, etc.) to generate an output signal, and may provide the output signal to one or more other devices or systems. For example, controller 225 may receive one or more input signals from magnetic sensor 220, and may use the one or more input signals to generate an output signal comprising the state of object 205 to which magnet 215 is connected.

The number and arrangement of apparatuses shown in FIGS. 2A and 2B are provided as an example. In practice, there may be additional apparatuses, fewer apparatuses, different apparatuses, or differently arranged apparatuses than those shown in FIGS. 2A and 2B. Furthermore, two or more apparatuses shown in FIGS. 2A and 2B may be implemented within a single apparatus, or a single apparatus shown in FIGS. 2A and 2B may be implemented as multiple, distributed apparatuses. Additionally, or alternatively, a set of apparatuses (e.g., one or more apparatuses) of environment 200 may perform one or more functions described as being performed by another set of apparatuses of environment 200.

Figure 3:
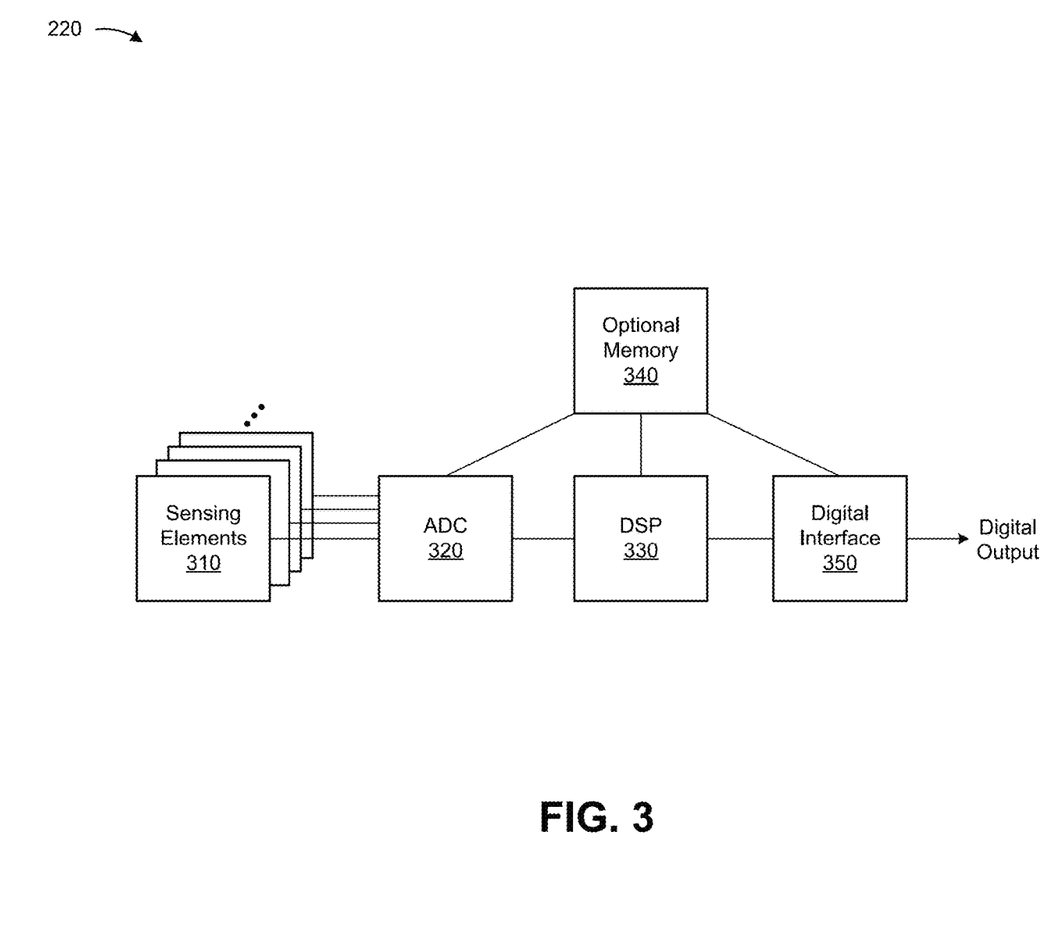
FIG. 3 is a diagram of example elements of a magnetic sensor included in the example environment of FIG. 2.

FIG. 3 is a diagram of example elements of magnetic sensor 220 included in example environment 200 of FIG. 2. As shown, magnetic sensor 220 may include a set of sensing elements 310, an analog-to-digital convertor (ADC) 320, a digital signal processor (DSP) 330, an optional memory element 340, and a digital interface 350.

Sensing element 310 includes an element for sensing a component of a magnetic field present at magnetic sensor 220 (e.g., the magnetic field generated by magnet 215). For example, sensing element 310 may include a Hall-based sensing element that operates based on a Hall-effect. As another example, sensing element 310 may include a MR-based sensing element, elements of which are comprised of a magnetoresistive material (e.g., nickel-iron (NiFe)), where the electrical resistance of the magnetoresistive material may depend on a strength and/or a direction of the magnetic field present at the magnetoresistive material. Here, sensing element 310 may operate based on an anisotropic magnetoresistance (AMR) effect, a giant magnetoresistance (GMR) effect, a tunnel magnetoresistance (TMR) effect, and/or the like. As an additional example, sensing element 310 may include a variable reluctance (VR) based sensing element that operates based on induction. In some implementations, magnetic sensor 220 may include multiple sensing elements 310. For example, magnetic sensor 220 may include a first sensing element 310 (e.g., including a first set of vertical Hall plates) that operates to sense an x-component of the magnetic field, a second sensing element 310 (e.g., including a second set of vertical Hall plates) that operates to sense y-component of the magnetic field, and a third sensing element 310 (e.g., including a set of lateral Hall plates) that operates to sense a z-component of the magnetic field.

ADC 320 may include an analog-to-digital converter that converts an analog signal from the set of sensing elements 310 to a digital signal. For example, ADC 320 may convert analog signals, received from the set of sensing elements 310, into digital signals to be processed by DSP 330. ADC 320 may provide the digital signals to DSP 330. In some implementations, magnetic sensor 220 may include one or more ADCs 320.

DSP 330 may include a digital signal processing device or a collection of digital signal processing devices. In some implementations, DSP 330 may receive digital signals from ADC 320 and may process the digital signals to form output signals (e.g., destined for controller 225 as shown in FIG. 2A), such as output signals associated with determining the rotation angle of magnet 215 rotating with a rotatable object.

Optional memory element 340 may include a read only memory (ROM) (e.g., an EEPROM), a random access memory (RAM), and/or another type of dynamic or static storage device (e.g., a flash memory, a magnetic memory, an optical memory, etc.) that stores information and/or instructions for use by magnetic sensor 220. In some implementations, optional memory element 340 may store information associated with processing performed by DSP 330. Additionally, or alternatively, optional memory element 340 may store configurational values or parameters for the set of sensing elements 310 and/or information for one or more other elements of magnetic sensor 220, such as ADC 320 or digital interface 350.

Digital interface 350 may include an interface via which magnetic sensor 220 may receive and/or provide information from and/or to another device, such as controller 225 (see FIG. 2A). For example, digital interface 350 may provide the output signal, determined by DSP 330, to controller 225 and may further receive information from the controller 225.

The number and arrangement of elements shown in FIG. 3 are provided as an example. In practice, magnetic sensor 220 may include additional elements, fewer elements, different elements, or differently arranged elements than those shown in FIG. 3. Additionally, or alternatively, a set of elements (e.g., one or more elements) of magnetic sensor 220 may perform one or more functions described as being performed by another set of elements of magnetic sensor 220.

FIGS. 4A-4E are diagrams associated with an example implementation of the magnetic sensor system described herein. FIGS. 4A-4E are associated with an example simulation 400 of the magnetic sensor system described herein. For the purposes of example simulation 400, object 205 may be positioned in one of five tilt positions (e.g., $T_0$, $Tx_1$, $Tx_2$, $Ty_1$, and $Ty_2$, where each of $Tx_1$, $Tx_2$, $Ty_1$, and $Ty_2$ is approximately 5° tilt from $T_0$), one of two linear positions (e.g., $Pz_1$ and $Pz_2$), and/or one of 32 rotational positions (e.g., $R_1$ through $R_{32}$), as described above. Here, assume that 161 states of object 205 are of interest in the given application, as described above with regard to FIG. 2A. Further, magnet 215 is a diametrically magnetized 3 mm cube-shaped magnet with a residual induction of 1000 mT that is arranged at a distance $d_o$ of 0.876 mm from axis of rotation 212, a distance $d_m$ of 12.6 mm from center of tilt 210 (e.g., in order to provide a tilt displacement of magnet 215 that is at least 1 mm), and with a magnet angle $\theta_M$ of 57°. Finally, magnetic sensor 220 is centered on axis of rotation 212 with an air gap distance $d_a$ of 1.5 mm (e.g., when object 205 is not tilted).

Figure 4A:
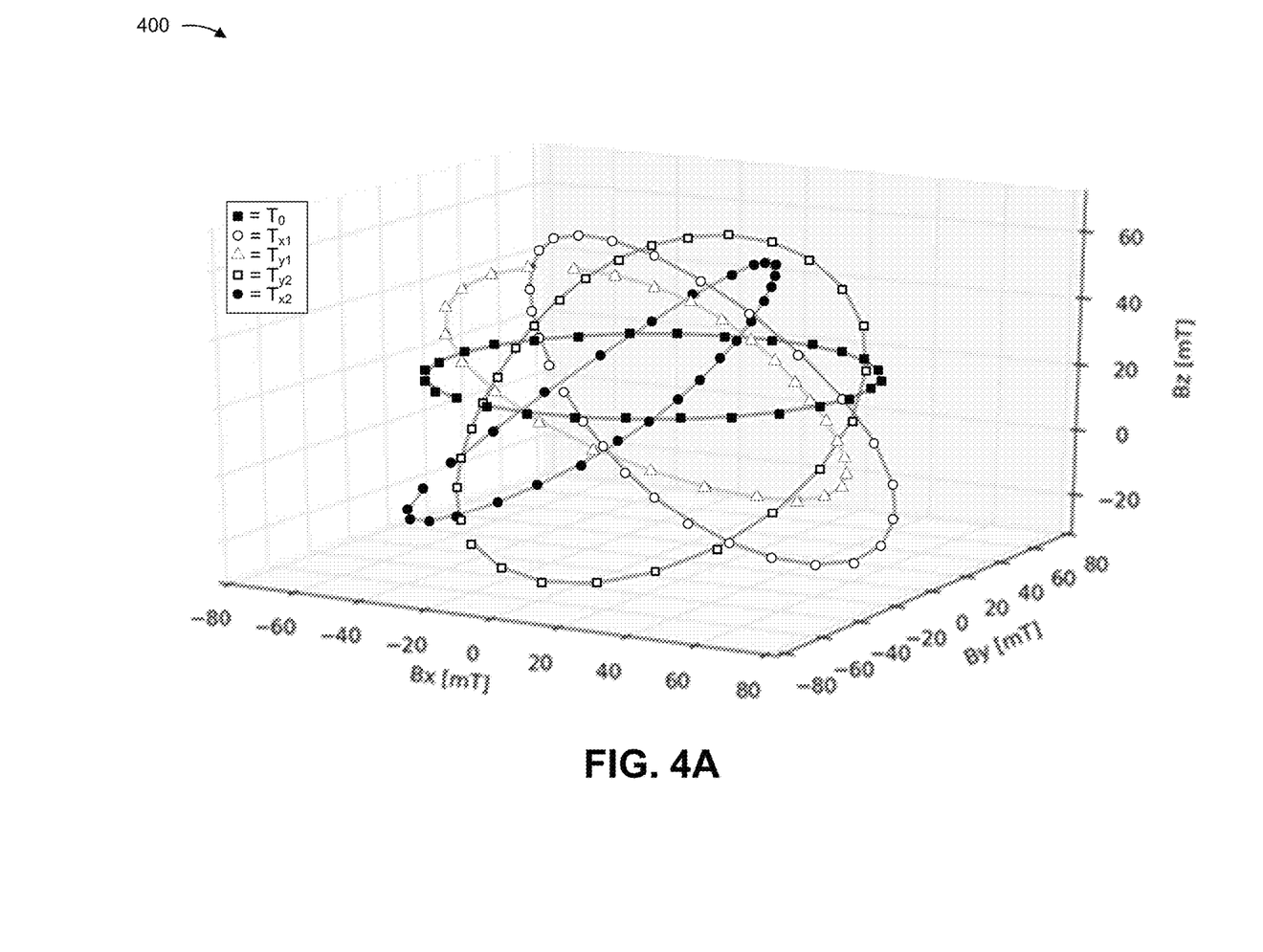
FIGS. 4A-4E are diagrams associated with an example implementation of the magnetic sensor system described herein.

FIG. 4A is an example graphical representation showing states of object 205 mapped in a three-dimensional magnetic space. In FIG. 4A, each ring of symbols corresponds to a different tilt position, and each symbol on each ring corresponds to a different rotational position. For example, as shown, the ring including the black squares corresponds to tilt position $T_0$, and each black square corresponds to one of the 32 possible rotational positions of object 205 while at tilt position $T_0$. As further shown, the ring including the white circular markers corresponds to tilt position $Tx_1$, and each marker corresponds to one of the 32 possible rotational positions of object 205 while at tilt position $Tx_1$. The ring including the black circular markers corresponds to tilt position $Tx_2$, and each marker corresponds to one of the 32 possible rotational positions of object 205 while at tilt position $Tx_2$. As further shown, the ring including the white triangular corresponds to tilt position $Ty_1$, and each marker corresponds to one of the 32 possible rotational positions of object 205 while at tilt position $Ty_1$. The ring including the white square markers corresponds to tilt position $Ty_2$, and each marker corresponds to one of the 32 possible rotational positions of object 205 while at tilt position $Ty_2$.

In FIG. 4A, each of 160 possible states of object 205 when object 205 is not in the pushed position (e.g., any of 32 rotational positions at any of five tilt positions, when object 205 is in linear position $Pz_1$) is represented by a different point in the three-dimensional magnetic space, where each point is defined by a magnetic field strength in the x-direction, the y-direction, and the z-direction, as shown. Thus, each state of object 205 may be mapped to a different set of magnetic field strengths. In FIG. 4A, a given point is separated from every other point by at least approximately 9.3 mT in the magnetic space, which is sufficient magnetic state separation to allow for reliable determination of the state of object 205. In some implementations, sufficient magnetic state separation may be similarly achieved even when object 205 is positioned in a greater number of rotational positions (i.e., the minimum separation may be less than 9.3 mT, such as separation of approximately 1 mT or more). For example, if object 205 was capable of being positioned in 44 (e.g., rather than 32) rotational positions in a similar arrangement, then each of 220 possible states (e.g., 160 possible states plus 60 additional possible states resulting from the additional rotational positions) a given point is separated from every other point by at least approximately 6.3 mT in the magnetic space, which may be sufficient magnetic state separation to allow for reliable determination of the state of object 205.

Figure 4B:
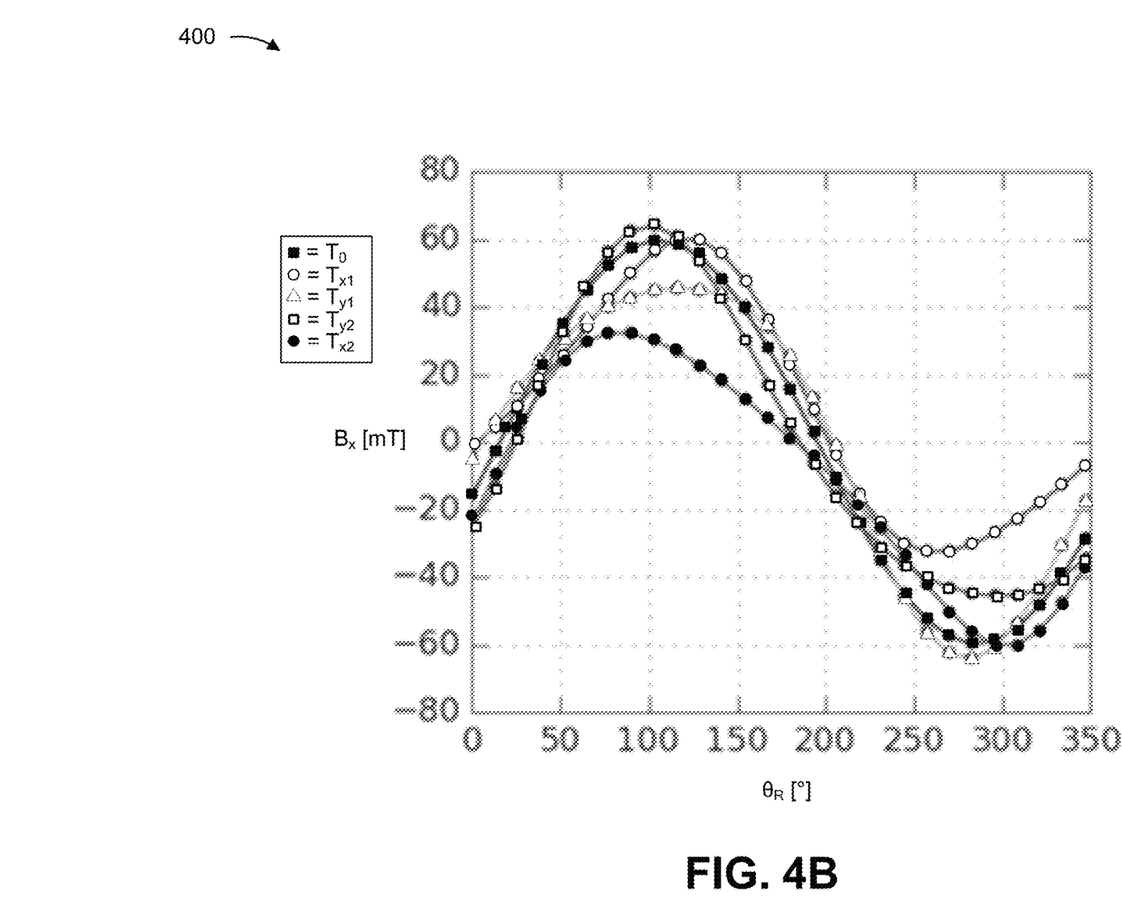
Figure 4C:
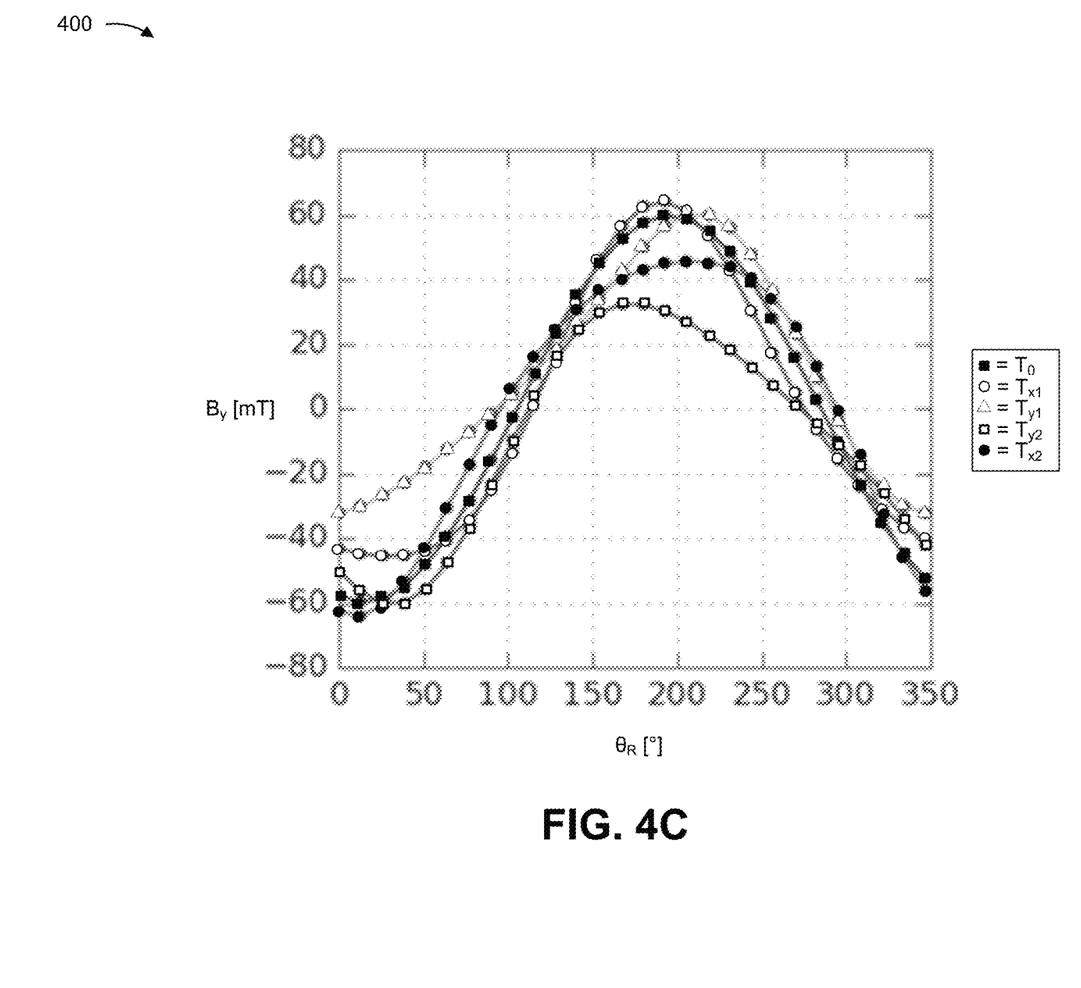
Figure 4D:
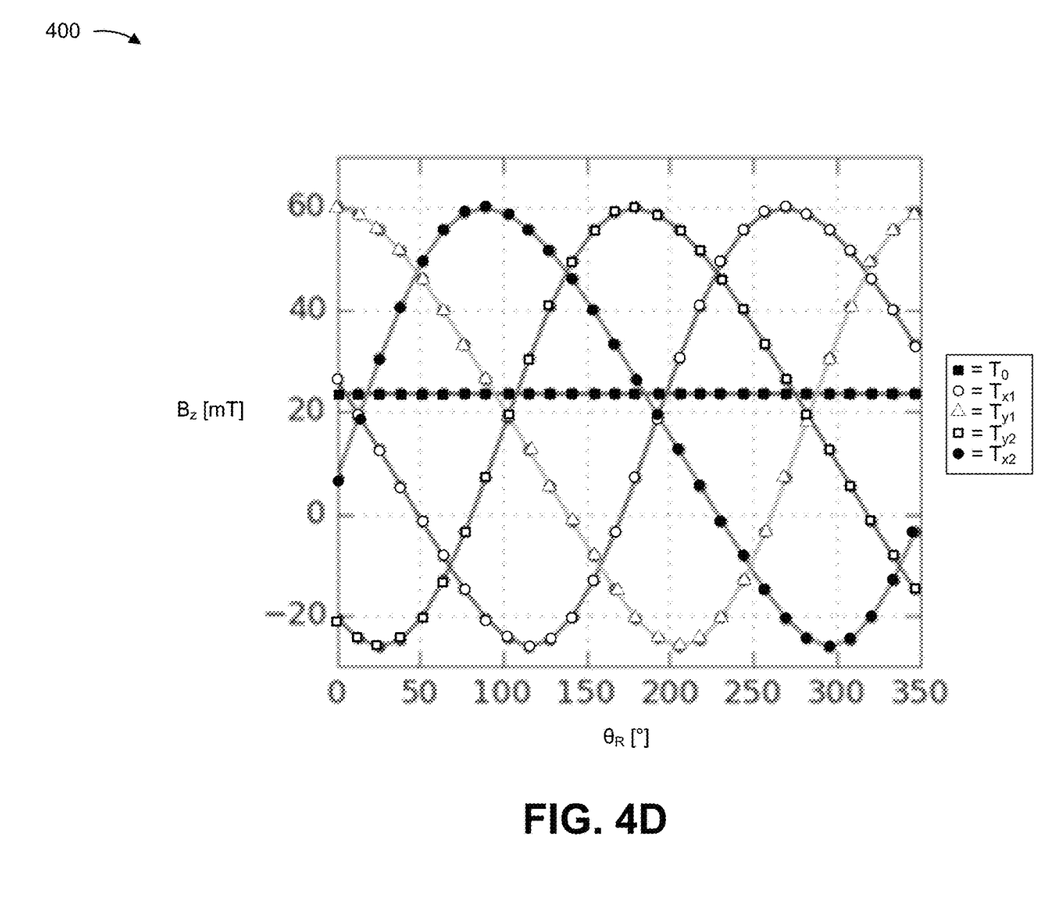

FIGS. 4B, 4C, and 4D are example graphical representations of one-dimensional magnetic spaces, corresponding to FIG. 4A, for the magnetic field strengths in the x-direction, the y-direction, and the z-direction, respectively.

Figure 4E:
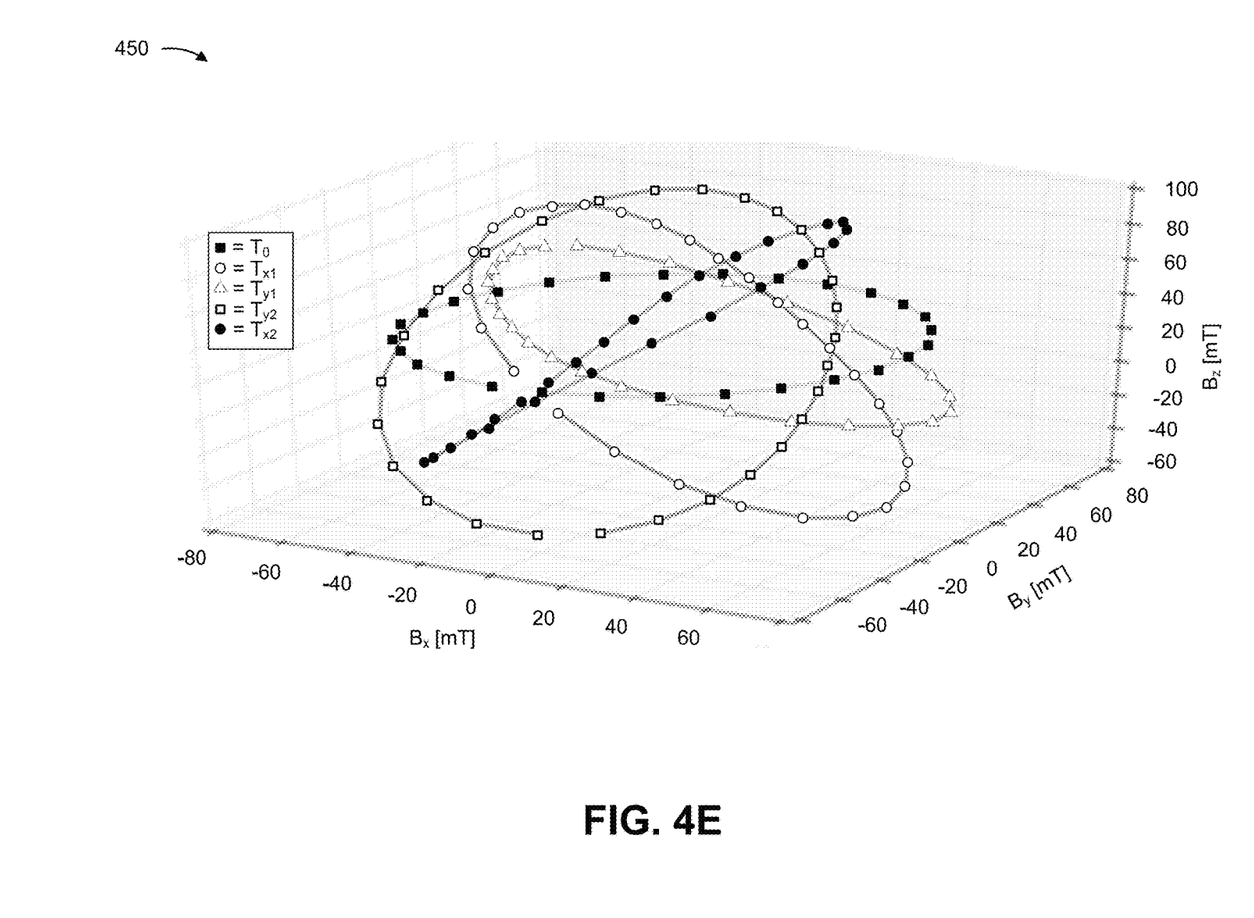

FIG. 4E is associated with an experimental result 450 of the simulated magnetic sensor system associated with example simulation 400. As shown in FIG. 4E, experimental result 450 closes matches example simulation 400 of FIG. 4A.

Notably, the magnetic spaces described above do not include a representation of a sensed magnetic field when object 205 is in the pushed position (e.g., when object 205 is in position $Pz_2$). However, when object 205 is in the pushed position, a strength of the z-component of the magnetic field at magnetic sensor 220 may be increased as compared to when object 205 is not in the pushed position (e.g., since the air gap between magnetic sensor 220 and magnet 215 may be decreased). In such a case, magnetic sensor 220 may determine that object 205 is in the pushed position based on determining that the z-component of the magnetic field satisfies a push-button threshold (e.g., is at or above a particular magnetic field strength), where the push-button threshold is high enough that the push-button threshold would not be satisfied when object 205 is not in the pushed position. In some implementations, magnetic sensor 220 may first determine whether object 205 is in the pushed position (e.g., based on the push-button threshold) and, if not, may determine the state based on mapping information associated with other possible positions.

As indicated above, FIGS. 4A-4E are provided merely as examples. Other examples are possible and may differ from what was described with regard to FIGS. 4A-4E.

Figure 5:
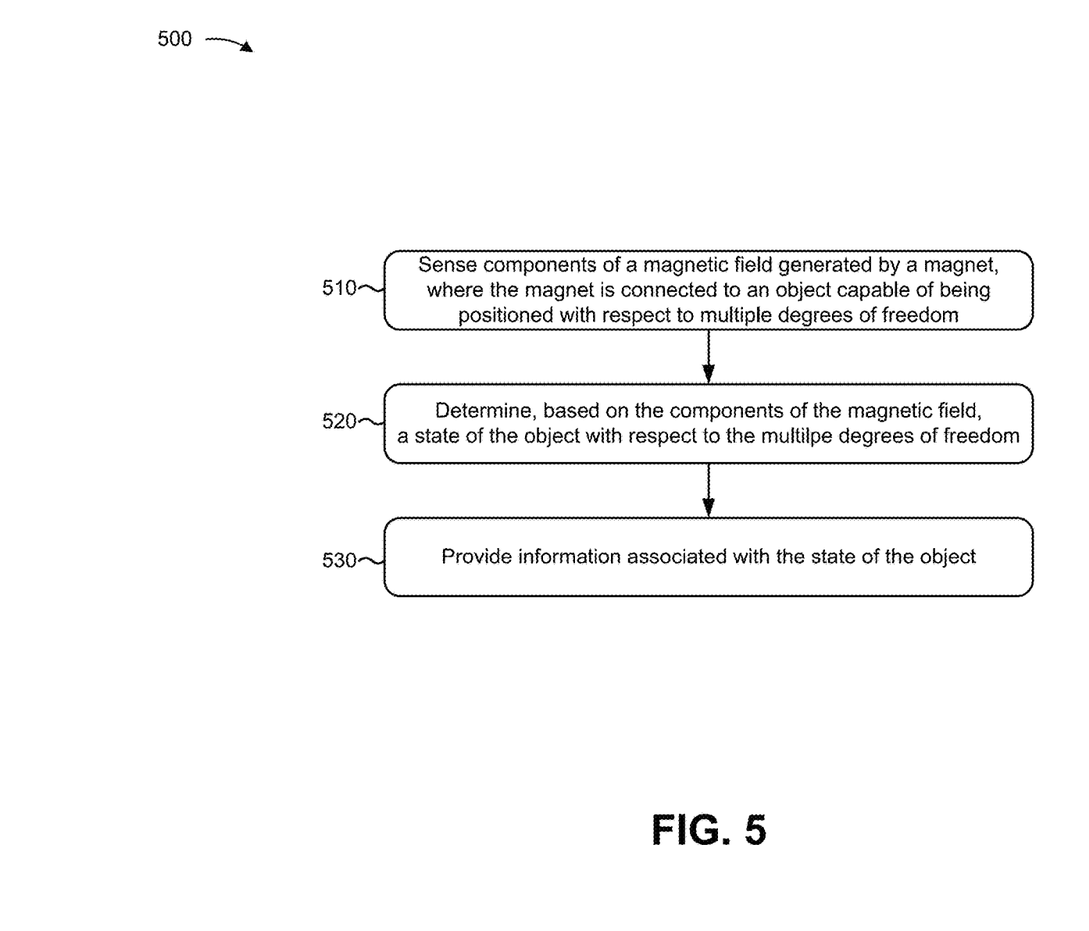
FIG. 5 is flow chart of an example process for determining a state of an object using the magnetic sensor system described herein.

FIG. 5 is a flow chart of an example process 500 for determining a state of object 205 using the magnetic sensor system described herein. In some implementations, one or more process blocks of FIG. 5 may be performed by magnetic sensor 220. In some implementations, one or more process blocks of FIG. 5 may be performed by another device or a group of devices separate from or including magnetic sensor 220, such as controller 225.

As shown in FIG. 5, process 500 may include sensing components of a magnetic field generated by a magnet, where the magnet is connected to an object capable of being positioned with respect to multiple degrees of freedom (block 510). For example, magnetic sensor 220 may sense components (e.g., including an x-component, a y-component, and a z-component) of a magnetic field generated by magnet 215, where magnet 215 is connected to object 205 capable of being positioned with respect to multiple degrees of freedom, as described above.

As further shown in FIG. 5, process 500 may include determining, based on the components of the magnetic field, a state of the object with respect to the multiple degrees of freedom (block 520). For example, magnetic sensor 220 may determine, based on the components of the magnetic field, a state of object 205 with respect to the multiple degrees of freedom.

In some implementations, magnetic sensor 220 may determine the state of object 205 based on a push-button threshold and/or mapping information configured on magnetic sensor 220. For example, assume that object 205 may be in the pushed position or the non-pushed position, and that, while in the non-pushed position, object 205 may be in one of multiple tilt positions and one of multiple rotational positions (assume that tilt position and rotational position are not of interest while object 205 is in the pushed position). In this example, magnetic sensor 220 may compare the amplitude of the magnetic field to the push-button threshold. Here, if the amplitude of the magnetic field satisfies the push-button threshold (e.g., if the value of the amplitude is greater than or equal to the push-button threshold), then magnetic sensor 220 may determine the state of object 205 as being in the pushed position.

Alternatively, if the amplitude of the magnetic field does not satisfy the push-button threshold (e.g., if the value of the amplitude is less than the push-button threshold), then magnetic sensor 220 may determine that object 205 is not in the pushed position (i.e., that push-button is not enabled). Magnetic sensor 220 may then compare the components of the magnetic field to mapping information that associates sets of magnetic field strengths with particular states of object 205, and may determine the state of object 205 based on identifying a set of magnetic field strengths that matches the components of the magnetic field, as described above.

As another example, assume that object 205 may be in the pushed position or the non-pushed position, and that, while in either the pushed position or the non-pushed position, object 205 may be in one of multiple tilt positions and one of multiple rotational positions (assume that tilt position and rotational position are of interest while object 205 is in the pushed position). In this example, magnetic sensor 220 may compare the components of the magnetic field to mapping information that associates sets of magnetic field strengths with particular states of object 205, and may determine the state of object 205 based on identifying a set of magnetic field strengths that matches the components of the magnetic field, as described above.

As further shown in FIG. 5, process 500 may include providing information associated with the state of the object (block 530). For example, magnetic sensor 220 may provide information associated with the state of object 205.

In some implementations, the information associated with the state of object 205 may include information that identifies the state of object 205, information that identifies magnetic field strengths of one or more sensed components of the magnetic field, information that identifies magnetic sensor 220, and/or the like.

In some implementations, magnetic sensor 220 may provide the information associated with the state of object 205 to controller 225 (e.g., such that a system may be controlled based on the state of object 205).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein provide a sensor system, including a single magnetic sensor and a single magnet, that is capable of detecting a state of an object with respect to multiple (e.g., four) degrees of freedom, such as a tilt with respect to a first direction, a tilt with respect to a second direction, a position along a third direction, and a rotational position. Since a single magnetic sensor and a single magnet are used, the sensor system described herein has a reduced complexity and/or a reduced cost (e.g., as compared to an implementation that uses multiple sensor systems to detect the state of the object). Moreover, the sensor system described herein provides for absolute encoding of the state of the object, thereby reducing complexity and/or increasing reliability of detecting the state of the object. Further, due to the use of magnetic sensing principles, the sensor system described herein has an increased lifetime (e.g., due to contact-free, and thus wear-free, operation), an increased potential for miniaturization, and an increased robustness against, for example, temperature and dirt.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A magnetic sensor, comprising: a set of elements to:
   detect a set of magnetic field strengths of a magnetic field generated by a magnet; and
   determine, based on the set of magnetic field strengths, a state of an object with respect to multiple degrees of freedom of object movement,
   the magnet being connected to the object such that a center of the magnet is offset from an axis of rotation of the object and such that the magnet is angled with respect to a direction that is perpendicular to the axis of rotation when the object is in an un-tilted position, and
   the magnetic sensor being centered on the axis of rotation of the object when the object is in the un-tilted position.

2. The magnetic sensor of claim 1, where the multiple degrees of freedom of object movement include at least two of:
   a tilt position with respect to an x-direction;
   a tilt position with respect to a y-direction;
   a linear position with respect to a z-direction; and
   a rotational position about the axis of rotation of the object,
     the x-direction being perpendicular to the y-direction,
     the z-direction being perpendicular to the x-direction and the y-direction, and
     the axis of rotation of the object being aligned with the z-direction when the object is in an un-tilted position.

3. The magnetic sensor of claim 1, where the state of the object is mapped to a point in a three-dimensional magnetic space based on the set of magnetic field strengths,
   the set of magnetic field strengths including a magnetic field strength in an x-direction, a magnetic field strength in a y-direction, and a magnetic field strength in a z-direction.

4. The magnetic sensor of claim 1, where a distance that the center of the magnet is offset from the axis of rotation the magnet is in a range from approximately 0.2 millimeters to approximately 5.0 millimeters.

5. The magnetic sensor of claim 1, where an angle that the magnet is angled with respect to the direction is in a range from approximately 10 degrees to approximately 80 degrees.

6. The magnetic sensor of claim 1, where a distance from a center of tilt, associated with the object to a surface of the magnet, is in a range from approximately 5 millimeters to approximately 30 millimeters.

7. The magnetic sensor of claim 1, where the magnet has a residual induction in a range from approximately 150 millitesla to approximately 1400 millitesla.

8. The magnetic sensor of claim 1, where the magnet has a dimension in a range from approximately 1 millimeter to approximately 15 millimeters.

9. The magnetic sensor of claim 1, where the magnetic sensor senses magnetic field strengths of approximately 150 millitesla.

10. The magnetic sensor of claim 1, where the object is a control element included in a vehicle.

11. An apparatus, comprising:
    a magnet connected to an object that is positioned with respect to multiple degrees of freedom,
      the magnet being connected to the object such that a center of the magnet is offset from an axis of rotation of the object and such that the magnet is angled with respect to a direction that is perpendicular to the axis of rotation; and
    a magnetic sensor to:
      determine a state of the object, with respect to the multiple degrees of freedom, based on a set of magnetic field strengths of a magnetic field generated by the magnet,
      the magnetic sensor being centered on the axis of rotation when the object is in an un-tilted position.

12. The apparatus of claim 11, where the multiple degrees of freedom include a tilt position with respect to an x-direction, a tilt position with respect to a y-direction, a linear position with respect to a z-direction, and a rotational position with respect to the axis of rotation of the object.

13. The apparatus of claim 11, where the state of the object is mapped to a point in a three-dimensional magnetic space based on the set of magnetic field strengths,
    the set of magnetic field strengths including a magnetic field strength in an x-direction, a magnetic field strength in a y-direction, and a magnetic field strength in a z-direction.

14. The apparatus of claim 13, where a magnetic state separation between the point, associated with the state, and another point, associated with another state is greater than or equal to approximately 1 millitesla.

15. The apparatus of claim 11, where a distance that the center of the magnet is offset from the axis of rotation is approximately equal to 0.9 millimeters.

16. The apparatus of claim 11, where an angle that the magnet is angled with respect to the direction is approximately equal to 57 degrees.

17. The apparatus of claim 11, where a distance from a center of tilt, associated with the object to a surface of the magnet, is approximately equal to 12.6 millimeters.

18. The apparatus of claim 11, where the magnet has a residual induction that is approximately equal to 1000 millitesla and the magnetic sensor senses magnetic field strengths of approximately 150 millitesla.

19. The apparatus of claim 11, where the object is associated with a multimedia control element.

20. A system comprising:
    an object that is positioned with respect to multiple degrees of freedom;
    a magnet asymmetrically connected to the object such that a center of the magnet is offset from an axis of rotation of the object and such that the magnet is angled with respect to a direction that is perpendicular to the axis of rotation; and
    a magnetic sensor to determine a state of the object, with respect to the multiple degrees of freedom, based on a magnetic field applied to the magnetic sensor by the magnet,
    the magnetic sensor being centered on the axis of rotation when the object is in an un-tilted position.

* * * * *